United States Patent
Lee et al.

(10) Patent No.: US 9,367,148 B2
(45) Date of Patent: Jun. 14, 2016

(54) SELECTIVE FRAME RATE SWITCHING

(71) Applicant: PixArt Imaging (Penang) SDN. BHD., Penang (MY)

(72) Inventors: Joon Chok Lee, Penang (MY); Kevin Len Li Lim, Penang (MY)

(73) Assignee: PixArt Imaging (Penang) SDN. BHD., Penang (MY)

(*) Notice: Subject to any disclaimer, the term of this patent is extended or adjusted under 35 U.S.C. 154(b) by 65 days.

(21) Appl. No.: 14/258,022

(22) Filed: Apr. 22, 2014

(65) Prior Publication Data
US 2015/0301630 A1   Oct. 22, 2015

(51) Int. Cl.
*G06F 3/03* (2006.01)
*G06F 3/0354* (2013.01)

(52) U.S. Cl.
CPC .................. *G06F 3/03543* (2013.01)

(58) Field of Classification Search
None
See application file for complete search history.

(56) References Cited

U.S. PATENT DOCUMENTS

| | | | |
|---|---|---|---|
| 6,995,748 B2 | 2/2006 | Gordon | |
| 7,292,225 B2 | 11/2007 | Gordon | |
| 7,511,699 B2 | 3/2009 | Shin | |
| 2005/0190158 A1* | 9/2005 | Casebolt | G06F 3/0383 345/166 |

FOREIGN PATENT DOCUMENTS

TW    I424335    1/2014

* cited by examiner

*Primary Examiner* — Joseph Haley
(74) *Attorney, Agent, or Firm* — Winston Hsu; Scott Margo

(57) ABSTRACT

A method for selectively switching a frame rate of a mouse includes: setting a plurality of acceleration thresholds respectively corresponding to a plurality of frame rates at which the mouse is operated; operating the mouse at a first frame rate of the plurality of frame rates; determining a velocity of the mouse according to a difference between a first frame captured by the mouse at the first frame rate and a second frame following the first frame captured by the mouse at the first frame rate; determining an acceleration of the mouse between the first captured frame and second captured frame according to the velocity of the first frame, the velocity of the second frame, and the frame rate; comparing the acceleration with the plurality of thresholds; and directly switching the frame rate of the mouse to a frame rate which corresponds to the determined threshold.

3 Claims, 2 Drawing Sheets

SELECTIVE FRAME RATE SWITCHING

BACKGROUND OF THE INVENTION

1. Field of the Invention

The present invention relates to adjusting the frame rates of a computer mouse, and more particularly, to a method for tracking the acceleration of a computer mouse, selecting a frame rate according to the acceleration, and directly switching to the selected frame rate.

2. Description of the Prior Art

Both standard and gaming mice are rated in frames per second (fps), which translates to the number of frames captured per second for detecting and calculating movement of the mouse. Each time a frame is captured, the mouse computes motion between a current frame and a previous frame. In addition, the mouse will report to (update) a USB at regular intervals, which is called the report rate. The mouse can then analyze all reported frames to estimate its position. The report rate usually depends on the mouse application, and is not dependent upon the frame rate. For example, a report rate of a standard mouse used in a home computer may be 8 ms, whereas a report rate of a gaming mouse may be as fast as 1 ms. If a gaming mouse has a frame rate of 10,000 fps and a report rate of 1 ms, there will be 10 frames of motion data for every USB report.

As the tracking velocity of the mouse increases, the distance between consecutive captured images increases. When two consecutive captured images are a particular distance apart, the mouse is unable to perform correlation between the two images. This is also due to the fact that most mouse sensors will only perform a correlation search over a small region in order to save power.

By increasing the frame rate when the mouse is moving at a higher velocity such that consecutive capture images are close enough for the mouse sensor to perform correlation, the mouse is able to track user motion accurately without losing track of its position. The high frame rate also prepares the mouse to track motion correctly in the event of sudden high acceleration. Please note that the USB update (the report rate) will not change. As long as the mouse sensor frame rate is faster than the report rate, the above benefits can be achieved.

In order to determine when the frame rate should be increased, the velocity of the mouse can be analyzed, and the frame rate increased when the velocity exceeds a certain threshold. Please refer to FIG. 1A, which is an illustration of how an average velocity of a frame can be determined. As illustrated in the diagram, Frame A is captured at a first time $t_1$, and Frame B is captured at a second time $t_2$. The frame period t is therefore equivalent to $t_2-t_1$, but can also be known by the frame rate at which the mouse is operating. According to a first reported position of the mouse at Frame A and a second reported position of the mouse at Frame B, a mouse motion delta, D, of the mouse can be known. The average velocity of Frame B is therefore calculated as V=D/t.

A computer mouse typically has a few different frame rates for collecting data. Example frame rates are as follows for a mouse that has four different frame rates:

Frame Rate A—FR_A (1000 fps)
Frame Rate B—FR_B (2000 fps)
Frame Rate C—FR_C (3000 fps)
Frame Rate D—FR_D (4000 fps)

As described in the above, the slower frame rates will be used at lower velocities of the mouse and the higher frame rates will be used when the mouse moves at a higher velocity. The slowest frame rate, FR_A, will therefore be used when the mouse is static, and FR_D will be used at the mouse's maximum achievable velocity.

In the conventional art, when the mouse is moved by a user from a static condition to its maximum velocity, the frame rate will increase in incremental steps, i.e. FR_A→FR_B→FR_C→FR_D. If the user moves the mouse at a high acceleration from the static condition, the large increase in velocity will not be reflected immediately, as the conventional method does not allow for the frame rate to directly jump from FR_A to FR_D. The user will see this slow increase in frame rate as a slow response from the mouse. In a worst case, the mouse may stop tracking altogether, as the collection of data is unable to be correlated with the motion of the mouse.

Another conventional solution therefore always operates the mouse at the highest frame rate, FR_D. Although this solves the above-mentioned problem, this method consumes a lot of power.

SUMMARY OF THE INVENTION

A method for selectively switching a frame rate of a mouse comprises: setting a plurality of acceleration thresholds respectively corresponding to a plurality of frame rates at which the mouse is operated; operating the mouse at a first frame rate of the plurality of frame rates; determining a velocity of the mouse according to a difference between a first frame captured by the mouse at the first frame rate and a second frame following the first frame captured by the mouse at the first frame rate; determining an acceleration of the mouse between the first captured frame and second captured frame according to the velocity of the first frame, the velocity of the second frame, and the frame rate; comparing the acceleration with the plurality of thresholds; and directly switching the frame rate of the mouse to a frame rate which corresponds to the determined threshold.

These and other objectives of the present invention will no doubt become obvious to those of ordinary skill in the art after reading the following detailed description of the preferred embodiment that is illustrated in the various figures and drawings.

DETAILED DESCRIPTION

The present invention therefore provides a solution to the problems of the conventional method, wherein frame rates can be increased or decreased without requiring a gradual change. This solution can meet higher acceleration demands of a computer mouse as well as save power consumption.

The present invention works by determining a current velocity the mouse is moving at and also determining the acceleration. This method is illustrated in FIG. 1B. As shown in the diagram, a first frame N is captured at time $t_1$. Rather than determining an average velocity of the frame N, an initial velocity, $V_i$ is determined. A following frame, N+1 is captured at time $t_2$. A final velocity, $V_f$, of this frame is determined. As in FIG. 1A, the frame period is equal to $t_2-t_1$ but can also be known by the current frame rate of the mouse.

The acceleration, a, is then determined using kinematic equations, as illustrated below:

$$a=(V_f-V_i)/t$$

wherein
a=acceleration from frame N to N+1
$V_i$=initial velocity of frame N
$V_f$=final velocity of frame N+1
t=time between frame N and N+1

Based on the acceleration, the system can determine which frame rate the mouse should operate at, and directly switch to that frame rate. Taking as an example a situation where the mouse is moved from a static condition, original frame rate will be FR_A. The system can set three thresholds for the acceleration: high acceleration, medium acceleration, and low acceleration, wherein the particular threshold can be set according to a system requirement or a user requirement.

If the determined acceleration is high, the frame rate will jump from FR_A to FR_D; if the determined acceleration is medium, the frame rate will jump from FR_A to FR_C; and if the determined acceleration is low, the frame rate increase will be as in the prior art, i.e. FR_A to FR_B. In the conventional art, even when the velocity of the mouse is large enough that the change in velocity from the mouse being in a static condition to being moved by the user is high, the system will only determine a velocity of the mouse, and will increase the frame rate incrementally. In the above-proposed solution, the system determines an acceleration of the mouse, and then directly switches the frame rate according to the determined acceleration.

Figure 2:
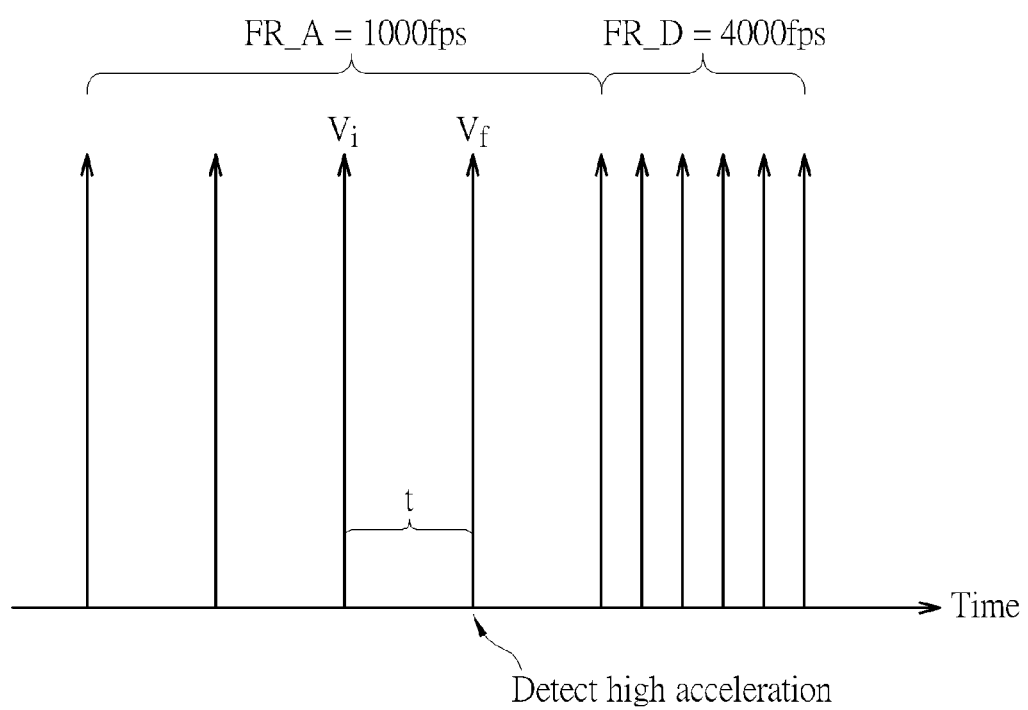
FIG. 2 is a diagram of how the frame rate changes according to an embodiment of the present invention.

Please refer to FIG. 2, which illustrates an implementation of the above method. As shown in the diagram, four frames are captured by the mouse at FR_A, which is 1000 fps in this example. An initial velocity, $V_i$, of the third frame is detected and a final velocity, $V_f$, of the fourth frame is detected. Using the kinematic equations and a determined frame period, t, the acceleration can be determined. The acceleration is determined to be high in this example; therefore, in a next captured frame after the high acceleration is detected, the frame rate is switched to FR_D, which is 4000 fps in this example.

A similar method can be applied to any decrease in mouse velocity between frames; in other words, negative acceleration or deceleration is used as a measure for altering the frame rate. This can serve to save power when the mouse is moving at lower velocities which do not require the highest frame rate. Please note that the direct switching of frame rates can also be applied to when the mouse is already moving, e.g. FR_B→FR_D.

As detailed in the background, conventional methods can determine to operate the mouse at the highest frame rate as soon as the mouse is moved. This application is particularly suitable for a gaming mouse, which is often operated at a high velocity. The mouse will continue to operate at the highest frame rate for a predetermined amount of time before down-shifting occurs. As the down-shifting is performed incrementally and as operating at higher frame rates requires more power than operating at lower frame rates, this conventional solution will consume a lot of power.

The present invention therefore provides an embodiment wherein the mouse will be operated at the highest frame rate when it is moved from a static condition, but velocity measurements a this frame rate are taken, and the frame rate will be directly down-shifted (if required) according to these velocity measurements. Power can thereby be saved.

During gaming, it is possible that the mouse will undergo small periods of acceleration or deceleration, but these will not be maintained. In the case of small periods of acceleration, immediately switching the frame rate to a higher frame rate may waste power consumption when the higher frame rate is not required. In the case of small periods of deceleration, immediately down-switching the frame rate may result in the mouse stopping normal tracking, due to a lack of correlation between the captured images.

The present invention therefore provides a filtering method which detects a change in acceleration over a longer period of time, and provides an appropriate frame rate accordingly. In a preferred embodiment, the following is applied to down-switching only.

Figure 1A:
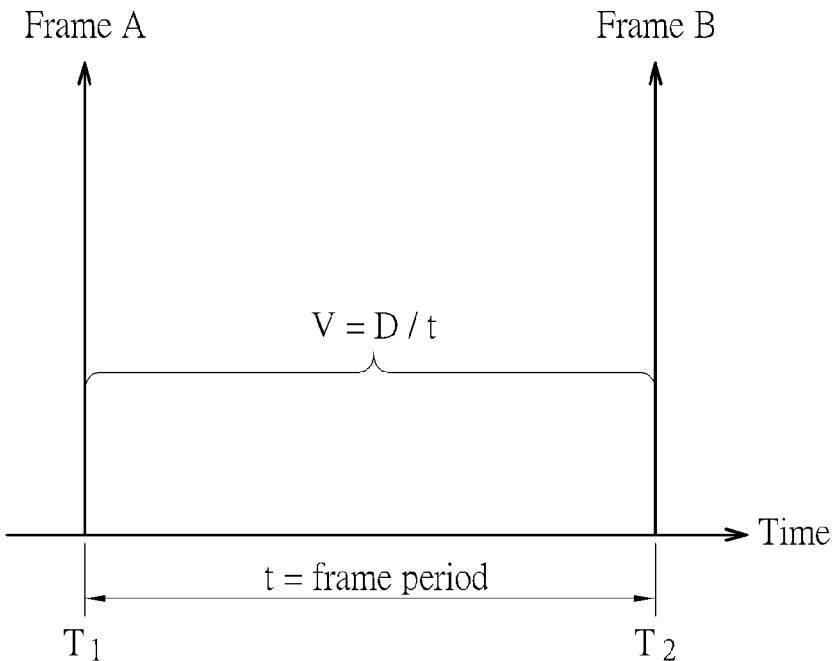
FIG. 1A is a diagram of how to measure the average velocity of a frame.
Figure 1B:
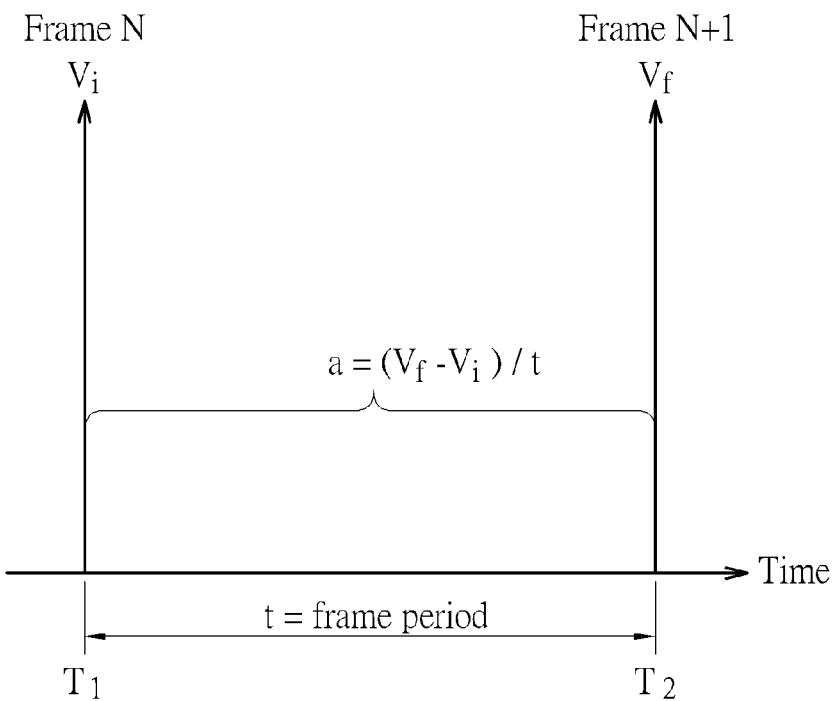
FIG. 1B is a diagram of how to measure the acceleration between a first frame and a second frame.

As in FIG. 1A, an average velocity of a frame will be measured, and the system also sets a plurality of velocity thresholds. The system operates at FR_D (for example), and an average velocity of five successive frames at this frame rate is measured. Please note that five is merely given as an example, rather than a limitation. When the average velocity of all five frames is below a certain velocity threshold set by the system, the mouse is determined to be moving at a maintained lower velocity that does not necessitate the frame rate FR_D, and the frame rate can therefore be down-shifted.

As the mouse may undergo slight variations in velocity even when the user intends to operate the mouse at a constant speed, a modification of the above embodiment applies an M of N filter to the mouse and down-shifts the frame rate when M out of every N frames are below the velocity threshold, wherein N is larger than M. For example, if M=5 and N=10, when 5 out of every 10 frames are below the velocity threshold, the frame rate can be down-shifted.

By utilizing acceleration between successive frames as a parameter for determining when to switch a frame rate, and directly switching the frame rate to a frame rate according to the measured acceleration, the system can operate a mouse at an appropriate frame rate for greater periods of time. In another embodiment, average velocity of a plurality of successive frames is used as a parameter for determining when to switch a frame rate, and the frame rate is directly switched to a frame rate according to the measured average velocity of a plurality of successive frames. The above methods save power consumption as well as ensuring greater correlation between motion of the mouse and a perceived motion of a pointer on a display screen.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for selectively switching a frame rate of a mouse, comprising:
   setting a plurality of acceleration thresholds respectively corresponding to a plurality of frame rates at which the mouse is operated;
   operating the mouse at a first frame rate of the plurality of frame rates;
   determining a velocity of the mouse according to a difference between a first frame captured by the mouse at the first frame rate and a second frame following the first frame captured by the mouse at the first frame rate;
   determining an acceleration of the mouse between the first captured frame and second captured frame according to the velocity of the first frame, the velocity of the second frame, and the frame rate;
   comparing the acceleration with the plurality of thresholds; and
   directly switching the frame rate of the mouse to a frame rate which corresponds to the determined threshold.

2. The method of claim 1, wherein the mouse is initially static and the first frame rate is a lowest frame rate of the plurality of frame rates.

3. The method of claim 1, wherein the mouse is initially moving and the first frame rate is selected according to a determined velocity of a captured frame prior to the first captured frame.

\* \* \* \* \*